(12) United States Patent
Warren et al.

(10) Patent No.: US 11,686,577 B2
(45) Date of Patent: Jun. 27, 2023

(54) ANTI-ROTATION METHOD FOR ANGLED FACE CAP PROBE

(71) Applicant: United Technologies Corporation, Farmington, CT (US)

(72) Inventors: Eli C. Warren, Wethersfield, CT (US); Kevin A. Ford, Killingworth, CT (US); Patrick M. Harrington, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 881 days.

(21) Appl. No.: 16/137,189

(22) Filed: Sep. 20, 2018

(65) Prior Publication Data

US 2020/0096331 A1 Mar. 26, 2020

(51) Int. Cl.
*G01B 21/00* (2006.01)
*G01B 21/16* (2006.01)
*F01D 21/00* (2006.01)
*G01D 11/16* (2006.01)
*F01D 21/04* (2006.01)

(52) U.S. Cl.
CPC .......... *G01B 21/16* (2013.01); *F01D 21/003* (2013.01); *G01D 11/16* (2013.01); *F01D 21/04* (2013.01)

(58) Field of Classification Search
CPC .......... F01D 21/04; G01B 7/14; G01B 21/16; G01D 11/16
USPC ....................................... 416/61; 324/207.13
See application file for complete search history.

(56) References Cited

U.S. PATENT DOCUMENTS

| 5,166,626 | A | * | 11/1992 | Hester | G01B 7/14 |
| | | | | | 324/683 |
| 5,731,507 | A | * | 3/1998 | Hagen | G01K 13/02 |
| | | | | | 73/182 |
| 6,742,402 | B1 | * | 6/2004 | Volz | G01D 11/30 |
| | | | | | 73/862.192 |
| 2014/0064925 | A1 | * | 3/2014 | Warren | G01B 21/16 |
| | | | | | 73/431 |
| 2018/0238673 | A1 | * | 8/2018 | Warren | F04D 27/001 |

FOREIGN PATENT DOCUMENTS

| CN | 106643458 | | 5/2017 |
| CN | 106643458 | A * | 5/2017 |

* cited by examiner

*Primary Examiner* — Logan M Kraft
*Assistant Examiner* — Joshua Campbell
(74) *Attorney, Agent, or Firm* — Snell & Wilmer L.L.P.

(57) ABSTRACT

An angled face cap probe includes a housing having a radially inner end and a radially outer end, defining a cavity, and configured to be located radially outward from an airfoil. The angled face cap probe further includes a sensor located in the cavity at the radially inner end of the housing, having a sensor body with a sensing face that is angled to match or substantially match an angle of a radially outward face the airfoil, and having a sensor flat that is elongated in a first direction. The angled face cap probe further includes an outer cap located in the cavity, coupled to the housing, and having an outer cap main body and cap legs that extend radially inward from the outer cap main body to interface with the sensor flat to resist rotation of the sensor relative to the housing.

20 Claims, 5 Drawing Sheets

ANTI-ROTATION METHOD FOR ANGLED FACE CAP PROBE

GOVERNMENT LICENSE RIGHTS

This invention was made with Government support awarded by the United States. The Government has certain rights in this invention.

FIELD

The present disclosure relates generally to gas turbine engines and, more particularly, to angled face cap probes for sensing a gap between a rotating airfoil and a casing component of a gas turbine engine.

BACKGROUND

Gas turbine engines include compressor sections to compress air, combustor sections that combine the airflow with fuel to facilitate combustion and generate exhaust, and turbine sections that convert the exhaust into torque to drive the compressor sections. The turbine sections and compressor sections may each include rotating airfoils. It is desirable to reduce a distance between an outer edge of the rotating airfoils and sealing components radially outward from the outer edge. This is because gas turbine engines may experiences a loss in performance that is proportional to the size of the gap between the airfoils and the sealing components. In some situations, angled face cap probes may be used to detect this distance in gas turbine engines having rotating airfoils with angled outer edges during design and testing of the gas turbine engines. Conventional angled face cap probes may experience damage to one or more component that allows a sensor of the angled face cap probe to rotate and extend into the path of the airfoil. This may undesirably damage the airfoil.

SUMMARY

Described herein is an angled face cap probe for use in a gas turbine engine having an axis. The angled face cap probe includes a housing having a radially inner end and a radially outer end, defining a cavity, and configured to be located radially outward from an airfoil. The angled face cap probe further includes a sensor located in the cavity at the radially inner end of the housing, having a sensor body with a sensing face that is angled to match or substantially match an angle of a radially outward face the airfoil, and having a sensor flat that is elongated in a first direction. The angled face cap probe further includes an outer cap located in the cavity, coupled to the housing, and having an outer cap main body and cap legs that extend radially inward from the outer cap main body to interface with the sensor flat to resist rotation of the sensor relative to the housing.

Any of the foregoing embodiments may further include a lower ceramic surrounding the sensor body and located radially inward from the sensor flat; and an upper ceramic located in the cavity between the outer cap main body and the sensor.

Any of the foregoing embodiments may further include an inner cap located in the cavity between the outer cap main body and the upper ceramic.

Any of the foregoing embodiments may further include a lead having an inner wire electrically coupled to the sensor and an outer insulator configured to insulate the inner wire, wherein the inner cap and the outer cap define a lead channel configured to receive at least a portion of the lead.

Any of the foregoing embodiments may further include a tack strap electrically and mechanically coupled to the inner wire of the lead and configured to be compressed between the upper ceramic and the sensor to form an electrical connection between the inner wire of the lead and the sensor.

In any of the foregoing embodiments, the upper ceramic defines a wire hole through which the inner wire of the lead extends to contact the tack strap.

In any of the foregoing embodiments, the inner cap tapers towards an inner cap inner end that applies compressive force to the sensor flat of the sensor.

Any of the foregoing embodiments may further include a pin, wherein: the inner cap defines an inner pin slot; at least one of the cap legs defines an outer pin slot; and the pin is configured to be received by the inner pin slot and the outer pin slot to resist movement of the inner cap relative to the outer cap.

In any of the foregoing embodiments, the cap legs are formed integral with the housing.

In any of the foregoing embodiments, the housing defines a pocket at the radially outer end adjacent to the cavity; and the outer cap defines a tab configured to be received by the pocket in response to the outer cap being properly aligned with the housing.

In any of the foregoing embodiments, the housing defines at least one fastener hole configured to receive a fastener to mechanically connect the housing to a component radially outward from the airfoil.

Also disclosed is an angled face cap probe for use in a gas turbine engine having an axis. The angled face cap probe includes a housing having a radially inner end and a radially outer end, defining a cavity, and configured to be located radially outward from an airfoil. The angled face cap probe further includes a sensor located in the cavity at the radially inner end of the housing, having a sensor body with a sensing face that is angled to match or substantially match an angle of a radially outward face the airfoil, and having a sensor flat that is elongated in a first direction. The angled face cap probe further includes an outer cap located in the cavity, coupled to the housing, and having an outer cap main body and cap legs that extend radially inward from the outer cap main body to interface with the sensor flat to resist rotation of the sensor relative to the housing. The angled face cap probe further includes an inner cap located in the cavity between the outer cap main body and the sensor.

Any of the foregoing embodiments may further include a lower ceramic surrounding the sensor body and located radially inward from the sensor flat; and an upper ceramic located in the cavity between the inner cap and the sensor.

Any of the foregoing embodiments may further include a lead having an inner wire electrically coupled to the sensor and an outer insulator configured to insulate the inner wire, wherein the inner cap and the outer cap define a lead channel configured to receive at least a portion of the lead.

Any of the foregoing embodiments may further include a tack strap electrically coupled to the inner wire of the lead and configured to be compressed between the upper ceramic and the sensor to form an electrical connection between the inner wire of the lead and the sensor.

In any of the foregoing embodiments, the upper ceramic defines a wire hole through which the inner wire of the lead extends to contact the tack strap.

In any of the foregoing embodiments, the cap legs interface with the sensor flat to resist rotation of the sensor relative to the housing in response to damage to at least one of the lower ceramic or the upper ceramic.

Also disclosed is an angled face cap probe for use in a gas turbine engine having an axis. The angled face cap probe includes a housing having a radially inner end and a radially outer end, defining a cavity, and configured to be located radially outward from an airfoil. The angled face cap probe further includes a sensor located in the cavity at the radially inner end of the housing, having a sensor body with a sensing face that is angled to match or substantially match an angle of a radially outward face the airfoil, and having a sensor flat that is elongated in a first direction. The angled face cap probe further includes an outer cap located in the cavity, coupled to the housing, and having an outer cap main body and cap legs that extend radially inward from the outer cap main body to interface with the sensor flat to resist rotation of the sensor relative to the housing. The angled face cap probe further includes an inner cap located in the cavity between the outer cap main body and the sensor and tapering towards an inner cap inner end that applies compressive force to the sensor flat of the sensor.

Any of the foregoing embodiments may further include a lower ceramic surrounding the sensor body and located radially inward from the sensor flat; and an upper ceramic located in the cavity between the inner cap and the sensor.

Any of the foregoing embodiments may further include a lead having an inner wire electrically coupled to the sensor and an outer insulator configured to insulate the inner wire, wherein the inner cap and the outer cap define a lead channel configured to receive at least a portion of the lead.

The foregoing features and elements are to be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Where used herein, the phrase "at least one of A or B" can include any of "A" only, "B" only, or "A and B."

Figure 1:
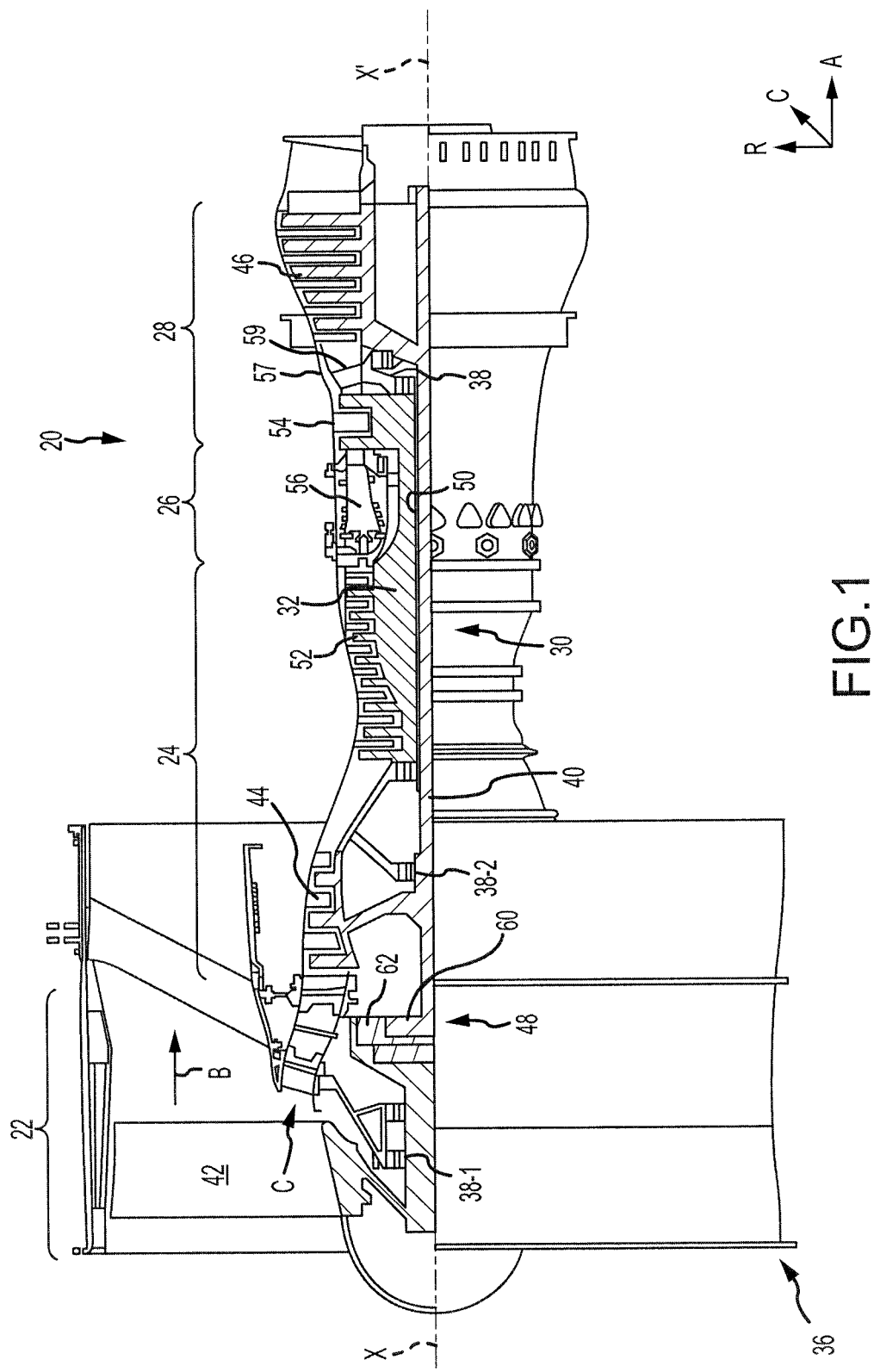
FIG. 1 is a cross-sectional view of an exemplary gas turbine engine, in accordance with various embodiments.

With reference to FIG. 1, a gas turbine engine 20 is provided. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction. An A-R-C axis is shown throughout the drawings to illustrate the relative position of various components.

The gas turbine engine 20 may be a two-spool turbofan that generally incorporates a fan section 22, a compressor section 24, a combustor section 26 and a turbine section 28. In operation, the fan section 22 drives air along a bypass flow-path B while the compressor section 24 drives air along a core flow-path C for compression and communication into the combustor section 26 then expansion through the turbine section 28. Although depicted as a turbofan gas turbine engine 20 herein, it should be understood that the concepts described herein are not limited to use with turbofans as the teachings may be applied to other types of turbine engines including three-spool architectures and turboshaft or industrial gas turbines with one or more spools.

The gas turbine engine 20 generally comprises a low speed spool 30 and a high speed spool 32 mounted for rotation about an engine central longitudinal axis X-X' relative to an engine static structure 36 via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 generally includes an inner shaft 40 that interconnects a fan 42, a low pressure (or first) compressor section 44 and a low pressure (or second) turbine section 46. The inner shaft 40 is connected to the fan 42 through a geared architecture 48 that can drive the fan shaft 98, and thus the fan 42, at a lower speed than the low speed spool 30. The geared architecture 48 includes a gear assembly 60 enclosed within a gear housing 62. The gear assembly 60 couples the inner shaft 40 to a rotating fan structure.

The high speed spool 32 includes an outer shaft 50 that interconnects a high pressure (or second) compressor section 52 and the high pressure (or first) turbine section 54. A combustor 56 is located between the high pressure compressor 52 and the high pressure turbine 54. A mid-turbine frame 57 of the engine static structure 36 is located generally between the high pressure turbine 54 and the low pressure turbine 46. The mid-turbine frame 57 supports one or more bearing systems 38 in the turbine section 28. The inner shaft 40 and the outer shaft 50 are concentric and rotate via the bearing systems 38 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by the low pressure compressor section 44 then the high pressure compressor 52, mixed and burned with fuel in the combustor 56, then expanded over the high pressure turbine 54 and the low pressure turbine 46. The mid-turbine frame 57 includes airfoils 59 which are in the core airflow path. The turbines 46, 54 rotationally drive the respective low speed spool 30 and high speed spool 32 in response to the expansion.

The gas turbine engine 20 is a high-bypass ratio geared aircraft engine. The bypass ratio of the gas turbine engine 20 may be greater than about six (6:1). The bypass ratio of the gas turbine engine 20 may also be greater than ten (10:1). The geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). The diameter of the fan 42 may be significantly larger than that of the low pressure compressor section 44, and the low pressure turbine 46 may have a pressure ratio that is greater than about five (5:1). The pressure ratio of the low pressure turbine 46 is measured prior to an inlet of the low pressure turbine 46 as related to the pressure at the outlet of the low pressure turbine 46. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in the high pressure compressor 52 than are conventionally experienced. These higher operating temperatures and pressure ratios create operating environments that cause thermal loads that are higher than the thermal loads conventionally experienced, which may shorten the operational life of current components.

Figure 2:
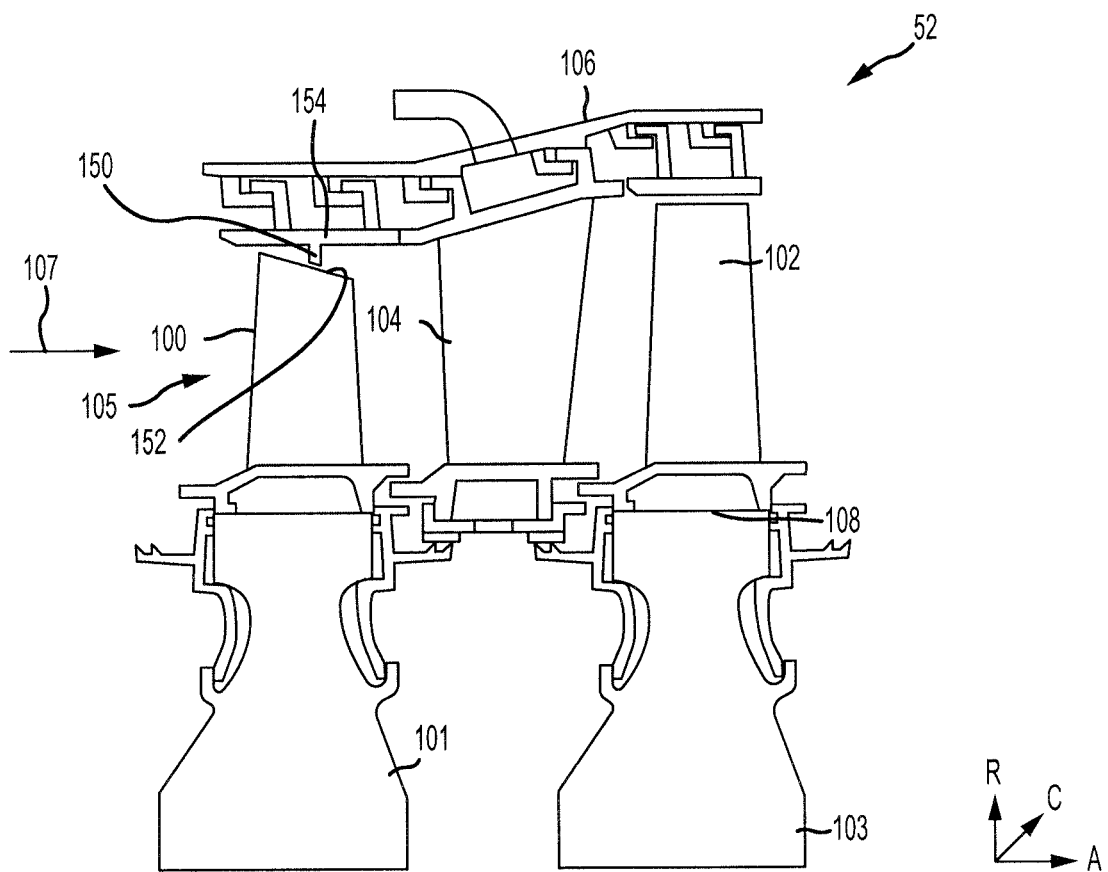
FIG. 2 is a cross-sectional view of a portion of a high pressure compressor section of the gas turbine engine of FIG. 1, in accordance with various embodiments.
Figure 3:
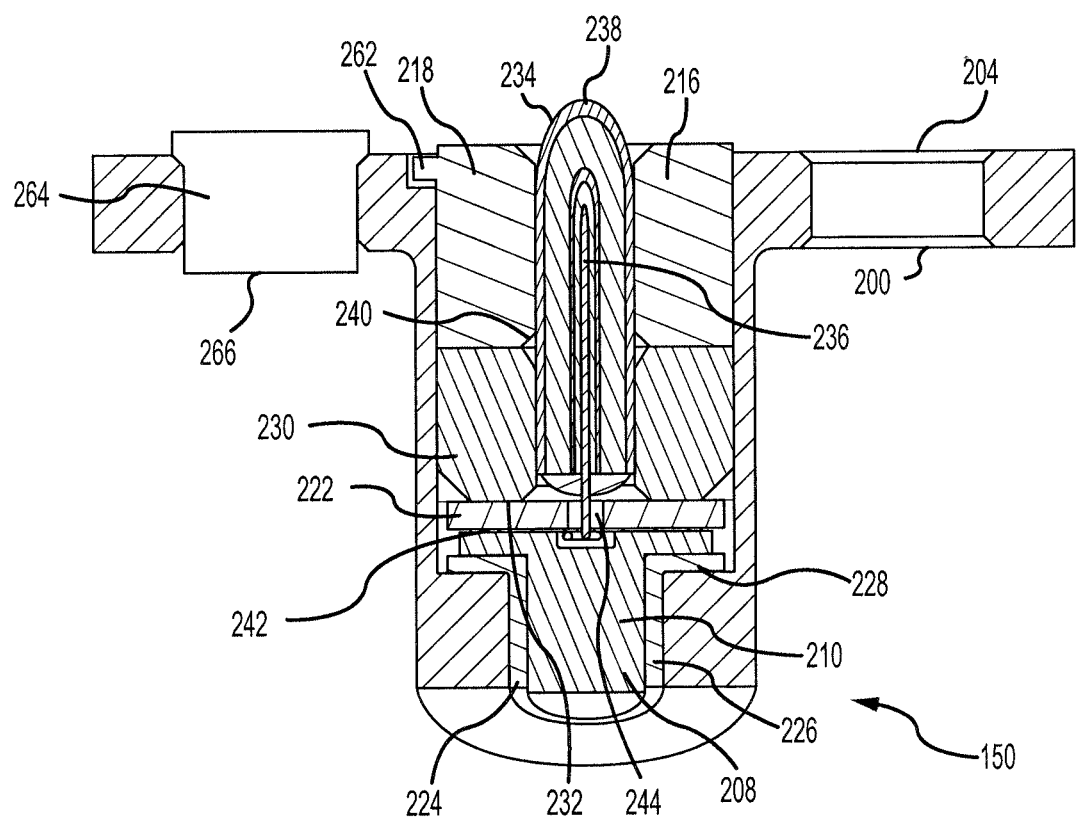
FIG. 3 is a cross-sectional axial view of an angled face cap probe used in the high pressure compressor section of FIG. 2, in accordance with various embodiments.
Figure 4:
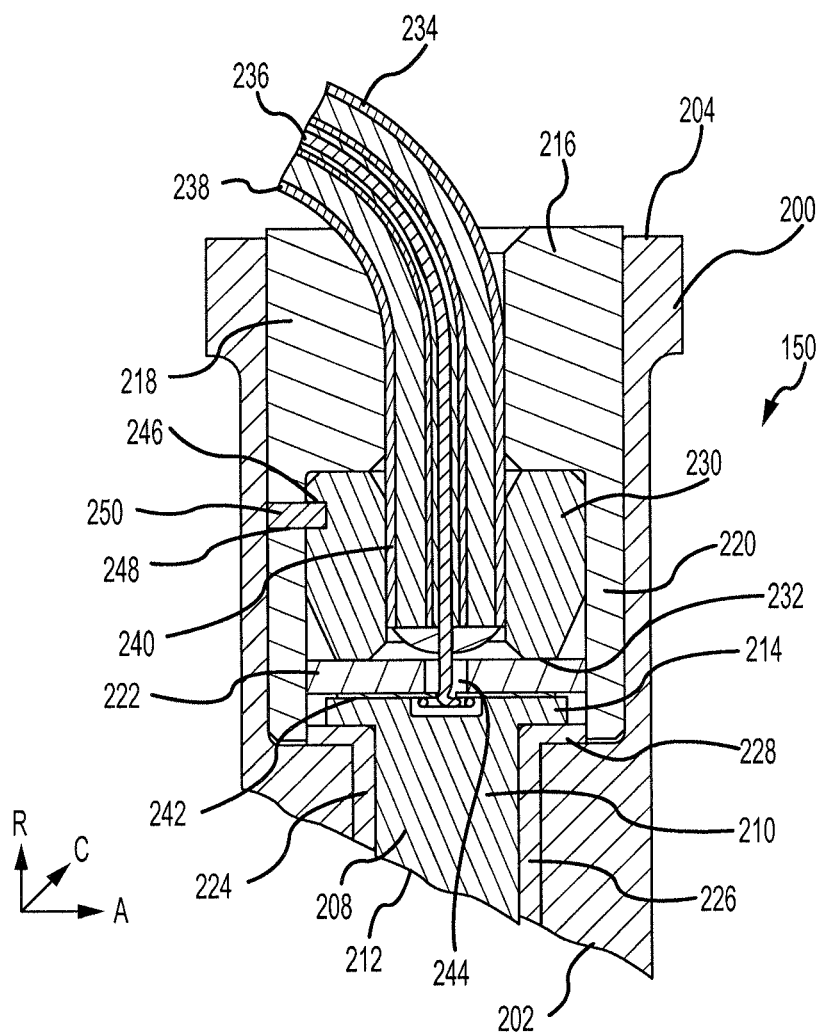
FIG. 4 is a cross-sectional circumferential view of the angled face cap probe of FIG. 3, in accordance with various embodiments.
Figure 5:
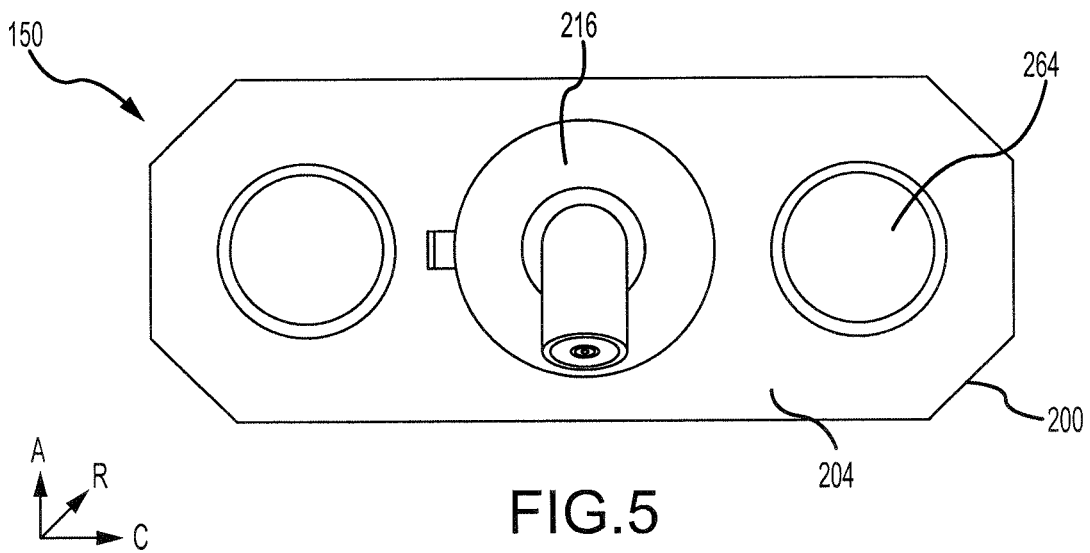
FIG. 5 is radially-inward view of the angled face cap probe of FIG. 3, in accordance with various embodiments.
Figure 6:
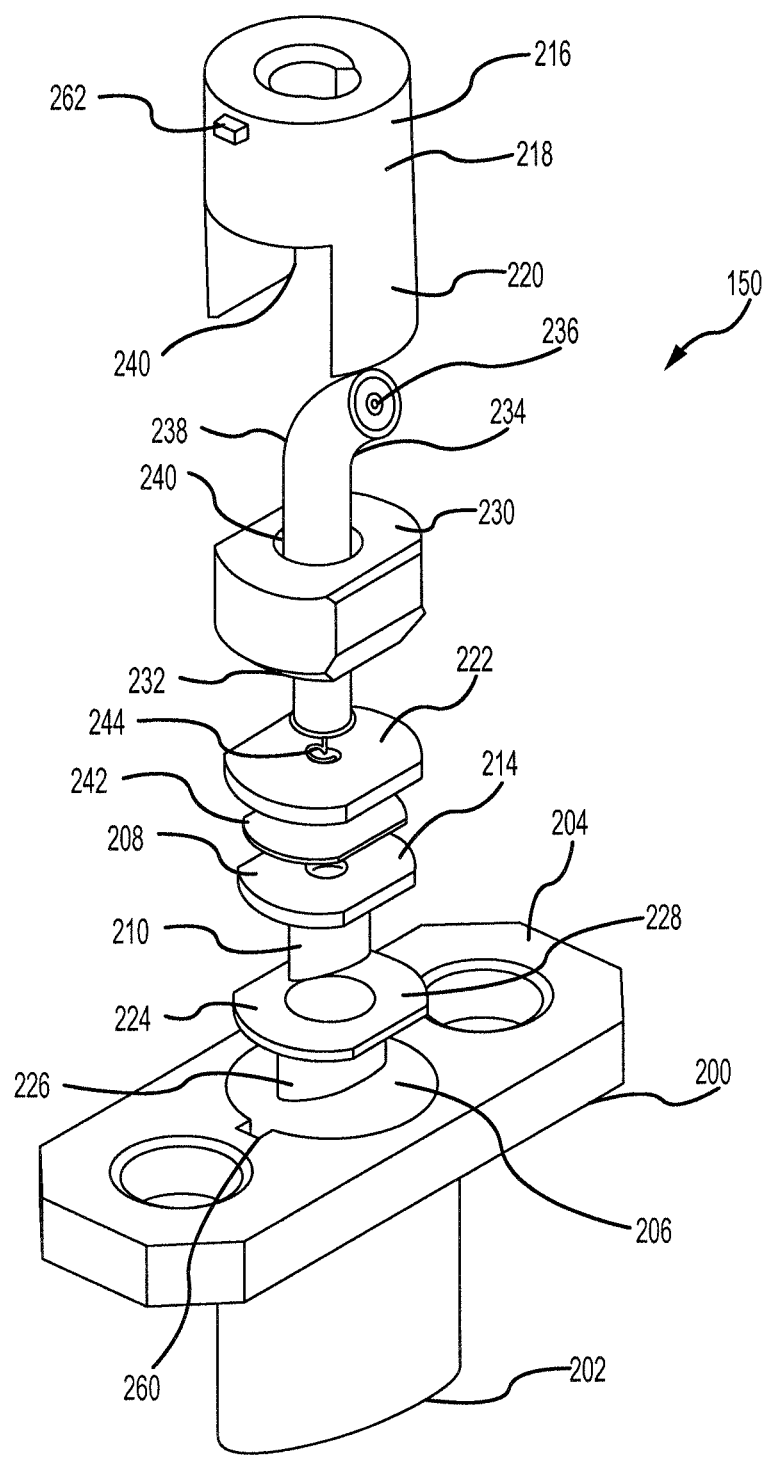
FIG. 6 is an exploded view of the angled face cap probe of FIG. 3, in accordance with various embodiments.

Referring now to FIGS. 1 and 2, the high pressure compressor 52 may include multiple airfoils 105 including multiple rows, or stages, of rotors including a first rotor 100 and a second rotor 102, along with rows, or stages, of stator assemblies located therebetween including a stator assembly 104. The rotors 100, 102 may be coupled to discs 101, 103 respectively which facilitate rotation of the rotors 100, 102 about the axis X-X' in response to receiving exhaust from the combustor section 56. This exhaust may be referred to as the gas path and may travel aftward, as shown by an arrow 107. The stator assembly 104 may be coupled to a case 106 and may remain stationary relative to the axis X-X' (i.e., the stator assembly 104 may fail to rotate about the axis X-X'). The stator assembly 104 may turn the exhaust so that it has a desirable orientation in response to the exhaust being received by the rotor 102.

The high pressure compressor section 52 may further include a rotor outer air seal (BOAS) 154 located radially outward from the rotor 100. The rotor 100 may have a radially outward face 152 that faces the BOAS 154. During engine testing or operation, it may be desirable to identify a distance between a radially outward face 152 of the rotor 100 and the BOAS 154. In that regard, the high pressure compressor section 52 may further include an angled face cap probe 150. The angled face cap probe 150 may be designed to detect a distance from an angled face of the angled face cap probe 150 to the radially outward face 152 of the rotor 100. In various embodiments, the radially outward face 152 of the rotor 100 may be angled, and the angled face cap probe 150 may have a radially inner end that is angled to match or substantially match the radially outward face 152 of the rotor 100. The angled face cap probe 150 may be used to measure a distance to any rotating airfoil of the gas turbine engine 20.

Turning now to FIGS. 3, 4, 5, and 6, the angled face cap probe 150 may include a housing 200. The housing 200 may include a radially inner end 202 and a radially outer end 204. The radially inner end 202 may be angled to match or substantially match (i.e., be the same as or within 10 percent as) the angle of the radially outward face 152 of the rotor 100 of FIG. 2. The housing 200 may further define a cavity 206 designed to receive various components of the angled face cap probe 150. The radially outer end 204 may define one or more fastener hole 264 configured to receive a fastener 266 to mechanically connect the housing 200 to the BOAS 154 of FIG. 2.

The angled face cap probe 150 may further include a sensor 208 located in the cavity 206. The sensor 208 may have a sensor body 210 that defines a sensing face 212 and may further include a sensor flat 214 extending axially and circumferentially away from the sensor body 210. The sensing face 212 may have an angle that matches or substantially matches that of the radially outward face 152 of the rotor 100 of FIG. 1. The sensing face 212 may form a capacitor interface with the radially outward face 152 of the rotor 100 of FIG. 2, and the capacitance of the sensing face 212 and rotor 100 interface may be used to determine the distance from the sensing face 212 to the radially outward face 152 of the rotor 100. The sensor flat 214 may be elongated and extend farther in the axial direction then the circumferential direction, or vice versa.

The angled face cap probe 150 may further include an outer cap 216 located in the cavity 206. The outer cap 216 may include an outer cap main body 218 along with cap legs 220 extending radially inward from the outer cap main body 218. The cap legs 220 may interface with the sensor flat 214 and may resist rotation of the sensor flat 214 relative to the outer cap 216 and thus the housing 200. That is, the cap legs 220 may fill a portion of the cavity 206 in which the elongated portion of the sensor flat 214 would occupy in response to rotation of the sensor 208, thus reducing the likelihood of rotation of the sensor 208. This may be desirable as rotation of the sensor 208 relative to the housing 200 may cause the sensor 208 to extend into the path of the rotor 100 of FIG. 2, thus damaging the rotor 100. In various embodiments, the housing 200 may form the cap legs 220 instead of the outer cap 216. In that regard, the cap legs 220 may instead be housing legs 220 and may similarly resist rotation of the sensor flat 214 relative to the housing.

The angled face cap probe 150 may further include an upper ceramic 222 and a lower ceramic 224. The upper ceramic 222 may have a shape similar to that of the sensor flat 214 and may be located in the cavity 206 radially outward from the sensor flat 214. The lower ceramic 224 may include a radial portion 226 that extends radially along the sensor body 210 and an axial portion 228 that extends radially and axially outward from the radially outer end of the radial portion 226.

The angled face cap probe 150 may further include an inner cap 230. The inner cap 230 may be located in the cavity 206 between the outer cap main body 218 and the upper ceramic 222. The inner cap 230 may taper towards an inner cap inner end 232. The inner cap inner end 232 may apply a compressive force to the upper ceramic 222 which in turn applies the force to the sensor flat 214. The tapering of the inner cap inner end 232 causes the inner cap inner end 232 to apply the force to the sensor flat 214 at a location that reduces the likelihood of damage to the sensor flat 214 by the inner cap 230. In various embodiments, the inner cap 230 and the outer cap 216 may be formed as a single component or may be formed as separate components.

The angled face cap probe 150 may further include a lead 234. The lead 234 may include an inner wire 236 that is electrically connected to the sensor 208 and an outer insulator 238 that insulates the inner wire 236. In that regard, any one or more of the housing 200, the inner cap 230, and the outer cap 216 may be conductive and be connected to an electrical ground. For example, the housing, the inner cap 230, and the outer cap 216 may include a nickel based alloy, stainless steel, or the like. The inner wire 236 may transmit the signal received by the sensor 208 to an external component. The outer insulator 238 may insulate the inner wire 236 from the housing 200, the inner cap 230, and the outer cap 216. The sensor 208 may include a conductive material such as a nickel based alloy, stainless steel, or the like.

The lead 234 may extend through a lead channel 240 defined by the inner cap 230 and the outer cap 216. The upper ceramic 222 may define a wire hole 244 through which the inner wire 236 extends. The angled face cap probe 150 may further include a tack strap 242. The tack strap 242 may include a metal or other conductor and may be compressed between the upper ceramic 222 and the sensor flat 214. The inner wire 236 of the lead 234 may extend through the tack strap 242 such that the tack strap 242 facilitates an electrical connection between the inner wire 236 and the sensor flat 214 due to the compression of the tack strap 242 between the upper ceramic 222 and the sensor flat 214.

The upper ceramic 222 and the lower ceramic 224 may electrically isolate the sensor 208 and the inner wire 236 from the housing 200, the inner cap 230, and the outer cap 216. The wire hole 244 of the upper ceramic 222 may provide strain relief to the inner wire 236 of the lead 234, reducing the likelihood of strain based damage to the wire hole 244 by allowing the inner wire 236 an area to expand or contract.

The inner cap 230 may be brazed to the lead 234 and the outer cap 216, and the outer cap 216 may be brazed to the lead 234 and the inner cap 230. The inner cap 230 and the outer cap 216 may be welded to the housing 200. This welding of the inner cap 230 and the outer cap 216 to the housing compresses the upper ceramic 222, the lower ceramic 224, the tack strap 242, and the sensor 208, thus causing them to maintain their relative position.

In various embodiments, it may be desirable to resist relative movement of the inner cap 230 and the outer cap 216 in response to failure of the brazing or welding. In that regard, a pin 250 may be used to resist movement of the inner cap 230 relative to the outer cap 216. The inner cap 230 may define an inner pin slot 246, and the outer cap 216 may define an outer pin slot 248. The pin 250 may extend through the inner pin slot 246 and the outer pin slot 248 to resist movement of the inner cap 230 relative to the outer cap 216.

The housing 200 may define a pocket 260 on the radially outer end 204. The outer cap 216 may include a tab 262 that is designed to be received by the pocket 260 to facilitate alignment of the outer cap 216 relative to the housing 200. In that regard, the outer cap 216 may be aligned with the housing 200 in response to the tab 262 being received by the pocket 260.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An angled face cap probe for use in a gas turbine engine, the angled face cap probe comprising:
a housing with a radial axis extending therethrough, the housing having a radially inner end and a radially outer end, defining a cavity, and configured to be located radially outward from an airfoil;
a sensor located in the cavity at the radially inner end of the housing, having a sensor body with a center axis extending therethrough, a sensing face, and a sensor flat, the sensing face disposed at a first end of the center axis and being angled to match or substantially match an angle of a radially outward face of the airfoil, the sensor flat disposed at a second end of the center axis that is orthogonal to the first end of the center axis, the sensor flat being elongated in a first direction to provide a first sensor flat side and a second sensor flat side opposite the first sensor flat side; and
an outer cap located in the cavity, coupled to the housing, and having an outer cap main body and cap legs that extend radially inward from the outer cap main body to interface with the sensor flat to resist rotation of the sensor relative to the housing, the cap legs including a first cap leg configured to engage the first sensor flat side and a second cap leg configured to engage the second sensor flat side upon rotation of the sensor about the radial axis.

2. The angled face cap probe of claim 1, further comprising:
a lower ceramic surrounding the sensor body and located radially inward from the sensor flat; and
an upper ceramic located in the cavity between the outer cap main body and the sensor.

3. The angled face cap probe of claim 2, further comprising an inner cap located in the cavity between the outer cap main body and the upper ceramic.

4. The angled face cap probe of claim 3, further comprising a lead having an inner wire electrically coupled to the sensor and an outer insulator configured to insulate the inner wire, wherein the inner cap and the outer cap define a lead channel configured to receive at least a portion of the lead.

5. The angled face cap probe of claim 4, further comprising a tack strap electrically and mechanically coupled to the inner wire of the lead and configured to be compressed between the upper ceramic and the sensor to form an electrical connection between the inner wire of the lead and the sensor.

6. The angled face cap probe of claim 5, wherein the upper ceramic defines a wire hole through which the inner wire of the lead extends to contact the tack strap.

7. The angled face cap probe of claim 3, wherein the inner cap tapers towards an inner cap inner end that applies compressive force to the sensor flat of the sensor.

8. The angled face cap probe of claim 3, further comprising a pin, wherein:
the inner cap defines an inner pin slot;
at least one of the cap legs defines an outer pin slot; and
the pin is configured to be received by the inner pin slot and the outer pin slot to resist movement of the inner cap relative to the outer cap.

9. The angled face cap probe of claim 2, wherein the cap legs are formed integral with the housing.

10. The angled face cap probe of claim 1, wherein:
the housing defines a pocket at the radially outer end adjacent to the cavity; and
the outer cap defines a tab configured to be received by the pocket in response to the outer cap being properly aligned with the housing.

11. The angled face cap probe of claim 1, wherein the housing defines at least one fastener hole configured to receive a fastener to mechanically connect the housing to a component radially outward from the airfoil.

12. An angled face cap probe for use in a gas turbine engine, the angled face cap probe comprising:
a housing with a radial axis extending therethrough, the housing having a radially inner end and a radially outer end, defining a cavity, and configured to be located radially outward from an airfoil;
a sensor located in the cavity at the radially inner end of the housing, having a sensor body with a center axis, a sensing face, and a sensor flat, the sensing face disposed at a first end of the center axis and being angled to match or substantially match an angle of a radially outward face of the airfoil, the sensor flat disposed at a second end of the center axis that is orthogonal to the first end of the center axis, the sensor flat being elongated in a first direction to provide a first sensor flat side and a second sensor flat side opposite the first sensor flat side;
an outer cap located in the cavity, coupled to the housing, and having an outer cap main body and cap legs that extend radially inward from the outer cap main body to interface with the sensor flat to resist rotation of the sensor relative to the housing, the cap legs including a first cap leg configured to engage the first sensor flat side and a second cap leg configured to engage the second sensor flat side upon rotation of the sensor about the radial axis; and
an inner cap located in the cavity between the outer cap main body and the sensor.

13. The angled face cap probe of claim 12, further comprising:
a lower ceramic surrounding the sensor body and located radially inward from the sensor flat; and
an upper ceramic located in the cavity between the inner cap and the sensor.

14. The angled face cap probe of claim 13, further comprising a lead having an inner wire electrically coupled to the sensor and an outer insulator configured to insulate the inner wire, wherein the inner cap and the outer cap define a lead channel configured to receive at least a portion of the lead.

15. The angled face cap probe of claim 14, further comprising a tack strap electrically coupled to the inner wire of the lead and configured to be compressed between the upper ceramic and the sensor to form an electrical connection between the inner wire of the lead and the sensor.

16. The angled face cap probe of claim 15, wherein the upper ceramic defines a wire hole through which the inner wire of the lead extends to contact the tack strap.

17. The angled face cap probe of claim 13, wherein the cap legs interface with the sensor flat to resist rotation of the sensor relative to the housing in response to damage to at least one of the lower ceramic or the upper ceramic.

18. An angled face cap probe for use in a gas turbine engine, the angled face cap probe comprising:
a housing with a radial axis extending therethrough, the housing having a radially inner end and a radially outer end, defining a cavity, and configured to be located radially outward from an airfoil;
a sensor located in the cavity at the radially inner end of the housing, having a sensor body with a center axis, a sensing face, and a sensor flat, the sensing face disposed at a first end of the center axis and being angled to match or substantially match an angle of a radially outward face of the airfoil, the sensor flat disposed at a second end of the center axis, the second end being orthogonal to the first end, the sensor flat being elongated in a first direction to provide a first sensor flat side and a second sensor flat side opposite the first sensor flat side;

an outer cap located in the cavity, coupled to the housing, and having an outer cap main body and cap legs that extend radially inward from the outer cap main body to interface with the sensor flat to resist rotation of the sensor relative to the housing, the cap legs including a first cap leg configured to engage the first sensor flat side and a second cap leg configured to engage the second sensor flat side upon rotation of the sensor about the radial axis; and an inner cap located in the cavity between the outer cap main body and the sensor and tapering towards an inner cap inner end that applies compressive force to the sensor flat of the sensor.

19. The angled face cap probe of claim 18, further comprising:

a lower ceramic surrounding the sensor body and located radially inward from the sensor flat; and an upper ceramic located in the cavity between the inner cap and the sensor.

20. The angled face cap probe of claim 19, further comprising a lead having an inner wire electrically coupled to the sensor and an outer insulator configured to insulate the inner wire, wherein the inner cap and the outer cap define a lead channel configured to receive at least a portion of the lead.

* * * * *